(12) United States Patent
Mulhern et al.

(10) Patent No.: US 6,474,689 B2
(45) Date of Patent: Nov. 5, 2002

(54) ADJUSTABLE TILLER FOR VEHICLE

(75) Inventors: James P. Mulhern, Hunlock Creek; Jason Julius Rasmus, Tunkhannock, both of PA (US)

(73) Assignee: Pride Mobility Products Corporation, Exeter, PA (US)

( * ) Notice: Subject to any disclaimer, the term of this patent is extended or adjusted under 35 U.S.C. 154(b) by 53 days.

(21) Appl. No.: 09/752,591

(22) Filed: Jan. 2, 2001

(65) Prior Publication Data

US 2002/0084115 A1 Jul. 4, 2002

(51) Int. Cl.$^7$ ............................................. B62D 1/14

(52) U.S. Cl. ................... 280/775; 280/47.371; 280/775; 280/211

(58) Field of Search ............................... 280/775, 278, 280/87.05, 47.371, 65.1, 211–217; 180/208; 74/493, 538; 403/93, 117

(56) References Cited

U.S. PATENT DOCUMENTS

| | | | | |
|---|---|---|---|---|
| 4,570,739 A | * | 2/1986 | Kramer | 180/216 |
| 4,591,122 A | | 5/1986 | Kreuzer | 248/280.1 |
| 4,830,133 A | * | 5/1989 | Gaddi | 180/208 |
| 4,947,955 A | * | 8/1990 | Hopely, Jr. | 180/216 |
| 5,020,624 A | * | 6/1991 | Nesterick et al. | 180/210 |
| 5,036,938 A | * | 8/1991 | Blount et al. | 180/208 |
| 5,816,614 A | | 10/1998 | Kramer et al. | 280/775 |
| 5,887,490 A | | 3/1999 | Dittmar | 740/551.3 |
| 6,050,593 A | | 4/2000 | McConnell et al. | 280/657 |
| 6,176,337 B1 | | 1/2001 | McConnell et al. | 180/208 |
| 6,179,307 B1 | * | 1/2001 | Mao | 280/87.041 |
| 6,270,097 B1 | * | 8/2001 | Lin | 280/87.05 |
| 6,332,621 B1 | * | 12/2001 | Wu | 280/87.041 |

FOREIGN PATENT DOCUMENTS

WO    98/57837    12/1998

* cited by examiner

Primary Examiner—Avraham Lerner
Assistant Examiner—L. Lum
(74) Attorney, Agent, or Firm—Drinker Biddle & Reath LLP

(57) ABSTRACT

A motorized scooter is disclosed that comprises a steering shaft mounted for rotation about its axis. A tiller is connected to said steering shaft to rotate said steering shaft, and pivotable relative to said steering shaft. A pivot block is mounted on the free end of said steering shaft, a pair of forks on said tiller straddle the pivot block, and a pivot pin passes through the forks and the pivot block. The pivot block has a pair of lubricating plates of low-friction material on either side of it, so that the forks rest on said lubricating plates to facilitate pivoting of said steering column. A strut of variable length is connected to the tiller and to said steering shaft so that pivoting of the tiller requires a change in the length of said strut. The strut comprises an inner shaft and an outer sleeve movable along said shaft to vary the length of said strut. Two helical coil springs that in a relaxed condition have an inside diameter smaller than the shalt grip the shaft frictionally to resist movement along the shaft. The coil springs are wound in opposite senses, and are positioned end to end, with their outer ends engaging the sleeve to prevent movement of the sleeve along the shaft and their abutting inner ends projecting radially. An actuating sleeve encircles the coil springs, free to rotate, and has one circumferential end engaging the projecting ends of the coil springs. A Bowden cable has its sleeve and its core respectively attached to the outer sleeve of the strut and to the actuating sleeve. Attached to the other end of the Bowden cable is a lever arranged to apply a tension to the core of the Bowden cable, and thereby to apply to the actuating sleeve and thence to the inner ends of said coil springs a force in a direction tending to increase the diameter of said coil springs.

18 Claims, 5 Drawing Sheets

ADJUSTABLE TILLER FOR VEHICLE

FIELD OF THE INVENTION

The present invention is generally related to adjustable tillers for motor vehicles. More particularly, the present invention is related to a tiller, for a motorized scooters for persons of limited mobility, the position of which is continuously adjustable.

BACKGROUND OF THE INVENTION

A scooter is a motorized, usually battery electric, vehicle, typically for a person who is able to walk but is not able to walk long distances. For psychological reasons, scooters are designed to look more like a motor-scooter than a wheelchair. Typically, the scooter has a pair of wheels driven by a motor at the rear, and one or two steerable wheels at the front controlled by a tiller. The tiller typically consists of a generally upright column with a pair of handlebars at the top. A seat for the user is positioned above the motor. Between the motor and the tiller is a footplate for the user's feet. The distance from the base of the tiller to the seated user is thus effectively fixed. However, different users have arms of different lengths, so it is desirable for the position of the handlebars to be adjustable towards and away from the user. Previous tiller adjustment systems allow the tiller to be pivoted forwards and backwards, but typically allow the tiller to be set only at certain fixed positions. Practical considerations in the design and construction of the adjustment systems result in a substantial separation between adjacent fixed positions. The separation is amplified because the adjustment system is typically at the base of the tiller, near its axis of pivoting, while the handlebars are at the top of the tiller, much further from the axis. As a result, previous adjustable tillers could not always be set to the optimum position, especially for a user of limited agility.

SUMMARY OF THE INVENTION

It is an object of the invention to provide a scooter with a tiller that can be adjusted easily and steplessly, but that remains securely in the position to which it has been adjusted.

According to one aspect of the invention, a motorized vehicle comprises at least one steerable wheel, and a member mounted rotatably about an axis and operatively connected to the at least one steerable wheel such that rotation of the rotatably mounted member about that axis causes steering of the at least one steerable wheel. A pivot block with a pair of lubricating plates of low-friction material on either side is mounted on a free end of the rotatably mounted member. A steering member to rotate the rotatably mounted member comprises a pair of forks straddling the pivot block and bearing on the lubricating plates. A pivot pin, about which the steering member is pivotable relative to the rotatably mounted member, passes through the forks and the pivot block transverse to the axis of rotation of the rotatably mounted member. A strut of variable length is so connected to the steering member and to the mounting block that pivoting of the steering member requires a change in the length of the strut. A clamp locks the strut at any length corresponding to a desired pivotal position of the steering member.

According to another aspect of the invention, a pivot block has a bore for a pivot pin passing through the pivot block, and has a pair of recesses surrounding the ends of the bore on either side of the pivot block. A pair of lubricating plates of low-friction material are fitted into the recesses. The lubricating plates define bearing surfaces for a pair of forks disposed either side of the pivot block and pivoting about a pivot pin positioned in the bore.

BRIEF DESCRIPTION OF THE DRAWINGS

For the purpose of illustrating the invention, the drawings show forms of the invention which arc presently preferred. However, it should be understood that this invention is not limited to the precise arrangements and instrumentalities shown in the drawings.

DETAILED DESCRIPTION OF THE DRAWINGS

Figure 1:
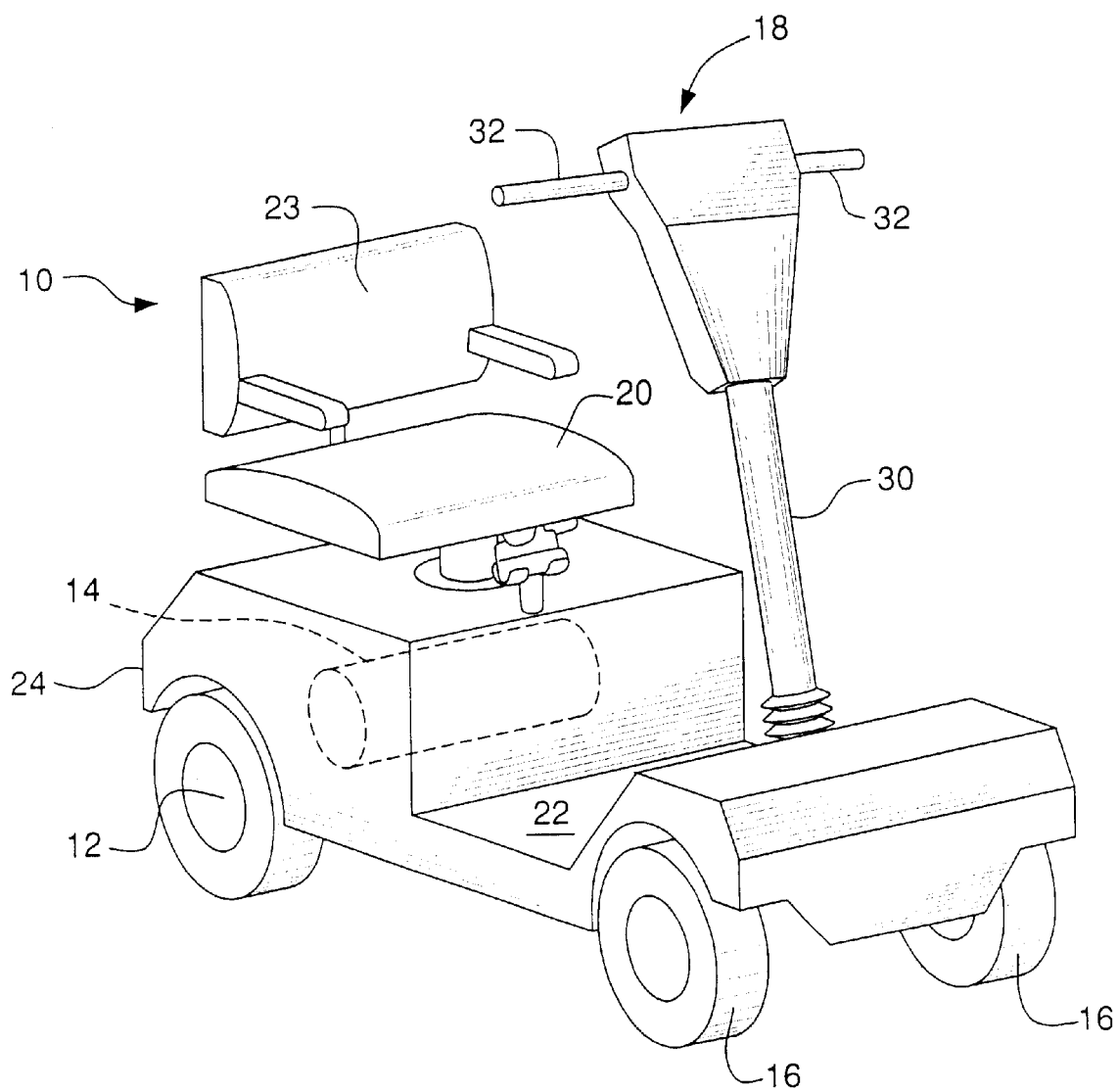
FIG. 1 is a perspective view of a scooter according to the present invention.

Referring to the drawings, FIG. 1 illustrates a scooter, which is generally denoted by the numeral 10. The scooter 10 is four-wheeled, with a pair of rear wheels 12 driven by a motor 14 and a pair of front wheels 16 that can be steered by means of a steering member in the form of a tiller generally indicated by the reference numeral 18.

A seat 20 is mounted towards the rear of the scooter 10. Between the seat 20 and the tiller 18, a footplate 22 extends the entire width of the scooter 10. The height of the seat 20 is set so that a user (not shown) can sit on the seat with his or her feet resting on the footplate 22. For good control of the scooter, and for ease in mounting and dismounting, the user sits in an upright posture, resting against a seat back 23 of the seat 20.

The motor 14 is mounted in a part 24 of the scooter 10 behind the footplate 22. A power supply for the motor, typically in the form of one or more electric storage batteries (not shown) is also mounted in the part 24. The motor, the batteries, any associated electrical power controllers, and the transmission between the motor and the wheels 12 may be conventional and, in the interests of conciseness, are not described in detail.

Figure 2:
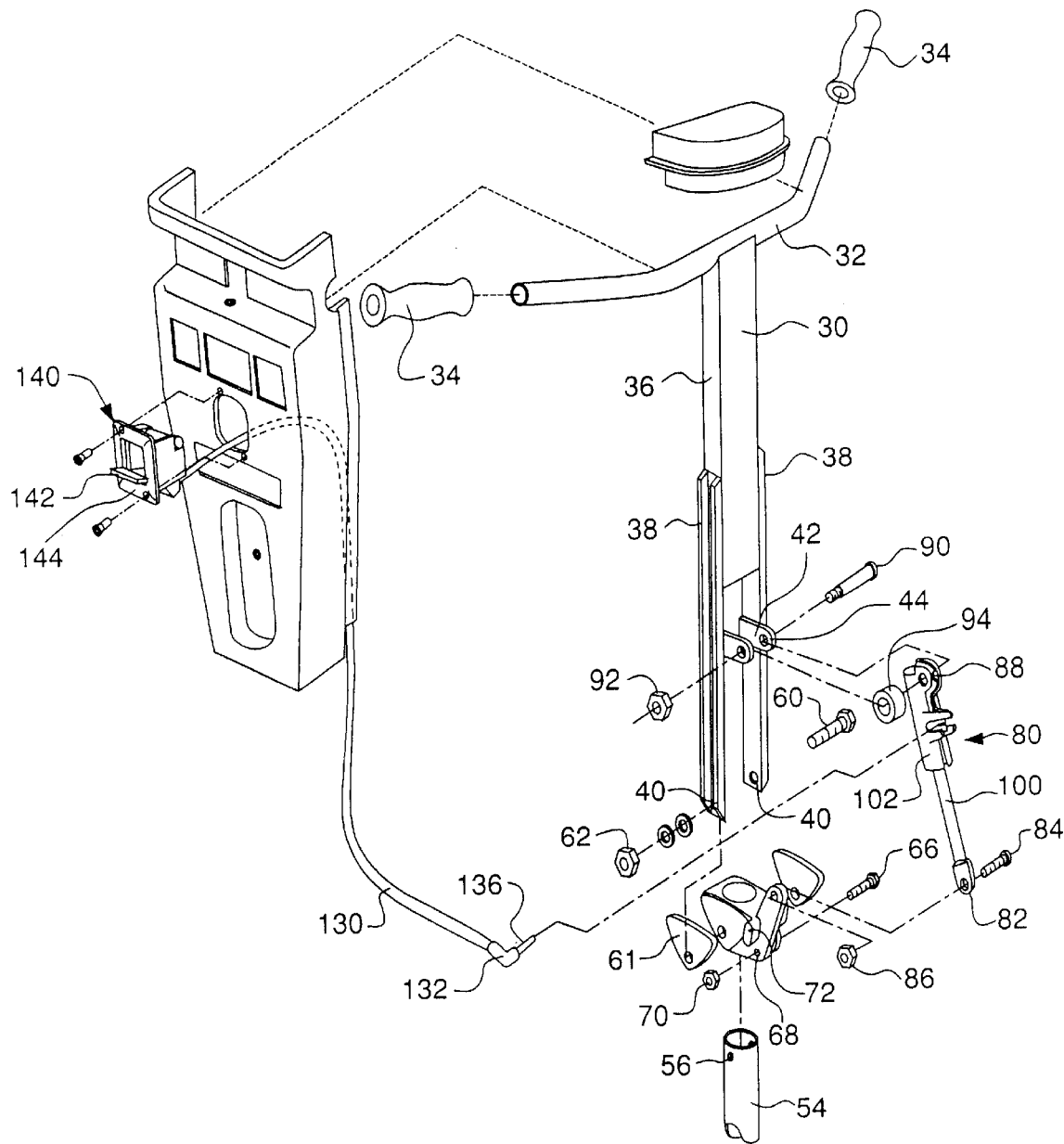
FIG. 2 is an exploded view of the tiller of the scooter shown in FIG. 1.

Referring now also to FIG. 2, the tiller 18 comprises a main column 30 with a pair of handlebars 32 fixed to its upper end. At each end of the handlebars 32 is a hand-grip 34. The upper part of the main column 30 is a rectangular box-section 36. The lower part of the main column 30 is a pair of forks in the form of U-channels 38, overlapping and integral with the box section 36. The U-channels 38 define flat, parallel surfaces facing each other on the inside of the forks. Near the bottom ends of the U-channels 38 are a pair of aligned holes 40. Further up the U-channels 38 are a pair of lugs 42, projecting forwards, with aligned holes 44 in them.

Figure 3:
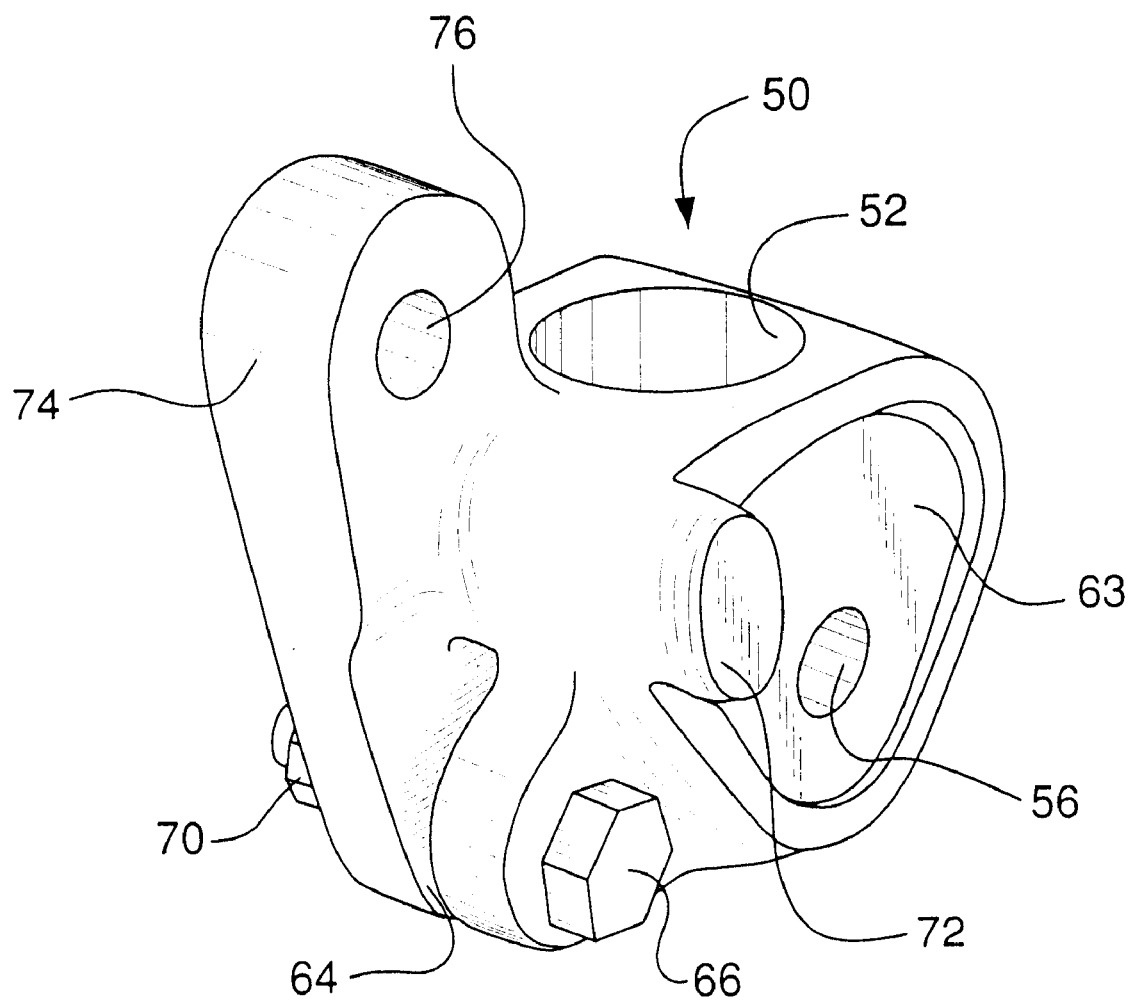
FIG. 3 is an enlarged perspective view of a pivot block seen in FIG. 2.

Referring now to FIGS. 2 and 3, between the bottom ends of the U-channels 38 is a pivot block, indicated generally by the reference number 50. The pivot block 50 has a central bore 52, which fits onto a rotatably mounted member in the form of a steering shaft 54, which is connected to the steering mechanism (not shown) of the scooter 10. The steering shaft 54 can rotate about its own axis, and when rotated operates the steering mechanism. The steering shaft 54 cannot move appreciably relative to the body of the scooter 10 in any other manner. A pivot hole 56 passes horizontally across the pivot block 50, crossing the center of the central bore 52, and the steering shaft 54 has a pair of holes 58. The main column 30, the pivot block 50, and the steering shaft 54 are assembled with the holes 40, 56, and 58 aligned. A shoulder bolt 60 passes through the aligned holes and is secured by a nut 62. The shoulder bolt 60 provides a pivot pin, around which the main column 30 can pivot fore and aft on the steering shaft 54.

The pivot hole 56 is so aligned that, when the scooter 10 is standing on level ground with the steering in the straight-ahead position, the shoulder bolt 60, and thus the axis of pivoting between the steering shaft 54 and the main column 30, is horizontal and is perpendicular to the lengthwise direction of the scooter.

A pair of lubricating plates 61, made of polytetrafluoroethylene or other suitable material, are seated in recesses 63 on either side of the pivot block 50. As may be seen from FIG. 1, the lubricating plates 61 also have holes through which the bolt 60 passes. The lubricating plates 61 project slightly from the recesses 63, and the insides of the U-channels 38 rest against the lubricating plates. As may be seen from FIG. 3, the recesses 63, and thus the lubricating plates 61, occupy almost the whole of the side faces of the pivot block 50, bounded only by narrow rims 65.

The flat faces of the U-channels 38 bear on the flat, parallel faces of the lubricating plates 61 over a large area. The large area affords a sturdy, rigid connection between the mounting block 50 and the U-channels 38 when the bolt 60 and the nut 62 are tightened. The low friction because of the lubricating plates 61 ensures that, even with the bolt 62 and nut 62 tight, the user can adjust the tiller position without needing to apply a large amount of force. This combination of high rigidity and easy adjustment is highly advantageous in use.

The lower part of the pivot block 50 has a slot 64 extending from the front edge to the central bore 52. A bolt 66 passes across the slot 64 through a bore 68. A nut 70 is tightened onto the bolt 66, squeezing the slot 64 closed, and tightening the lower part of the pivot block 50 onto the steering shaft 54. By this the pivot block 50 is secured rigidly to the steering shaft 54.

On each side of the pivot block 50, above and in front of the recess 63, is a projecting lug 72. If the main column 30 is pivoted too far forwards or too far backwards, the U-channels 38 come into contact with the lugs 72. The lugs 72 then serve as end-stops, preventing further pivotal movement.

Projecting upwards and forwards from the pivot block 50 is an eye 74 with a bore 76 through it parallel to the bore 56. As may best be seen in FIG. 3, the eye 74 is offset to the right-hand side of the pivot block 50. An adjuster strut indicated generally by the reference numeral 80 extends from the eye 74 on the pivot block 50 to the lugs 42 on the U-channels 38. At the lower end of the adjuster strut 80 is an eye 82 that is attached to the eye 74 by means of a shoulder bolt 84 and a nut 86. At the upper end of the adjuster strut 80 is an eye 88 which is attached to the lugs 42 by means of a shoulder bolt 90 and a nut 92. The length of the adjuster strut 80 thus sets the angle of the main column 30 relative to the pivot block 50 and thus the position of the tiller 18 relative to the steering shaft 54 and to the body of the scooter 10. The eye 82 at the lower end of the adjuster strut 80 is alongside the eye 74, so the adjuster strut is offset towards the left side of the vehicle. In order to avoid skewing of the adjuster strut 80, a spacer washer 94 is inserted between the eye 88 at the upper end of the adjuster strut 80 and the righthand lug 44.

Figure 4:
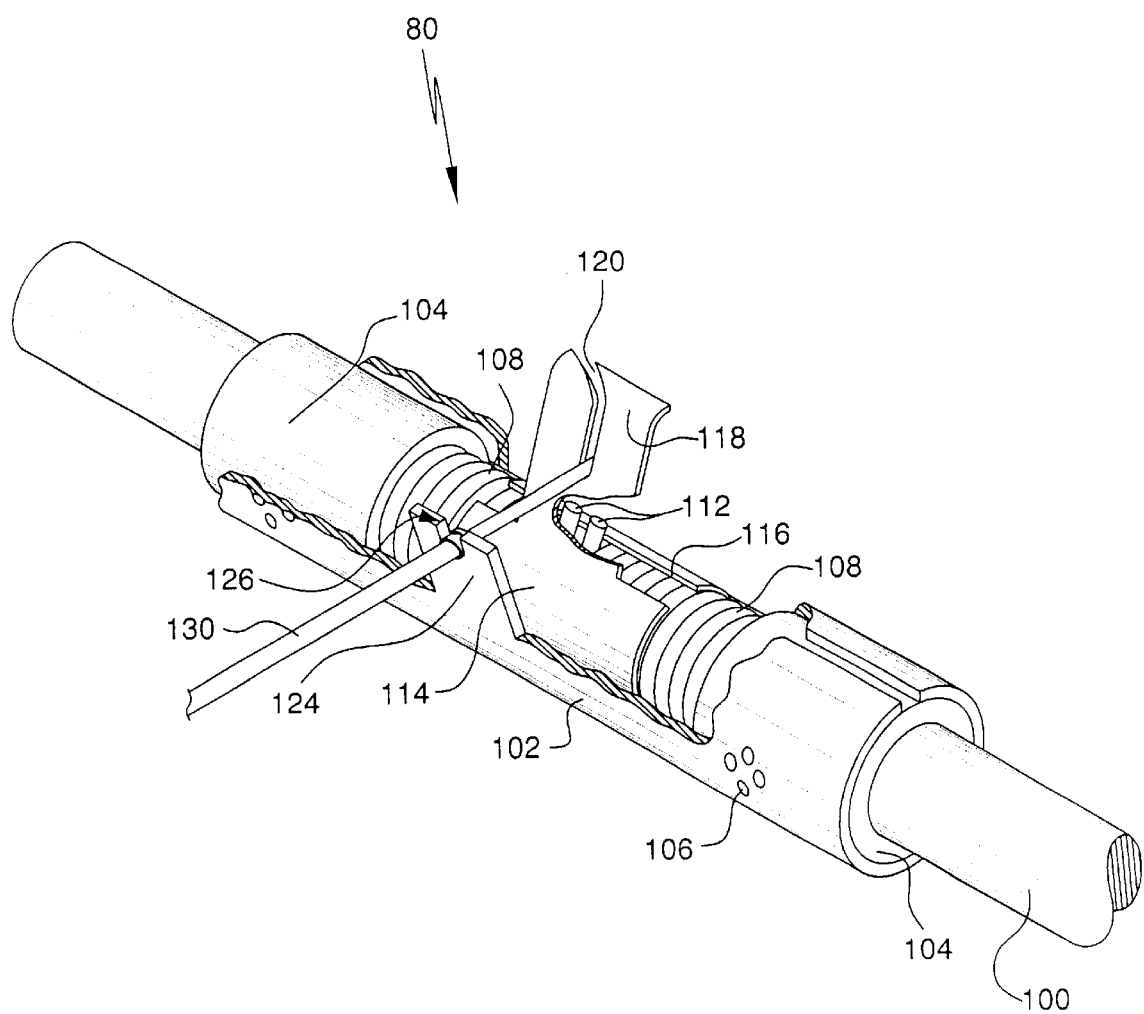
FIG. 4 is an enlarged perspective view of a clamp seen in FIG. 2.
Figure 5:
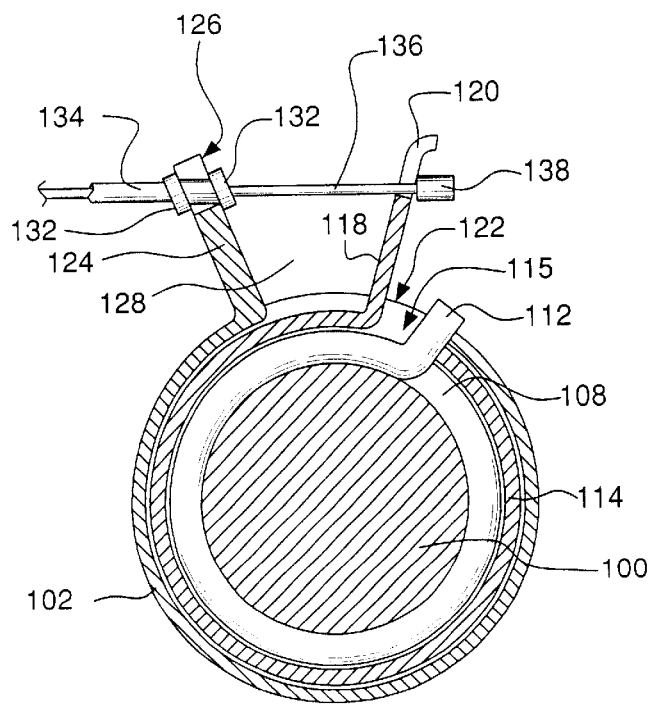
FIG. 5 is a cross-sectional view through the clamp seen in FIG. 4, with the clamp engaged.
Figure 6:
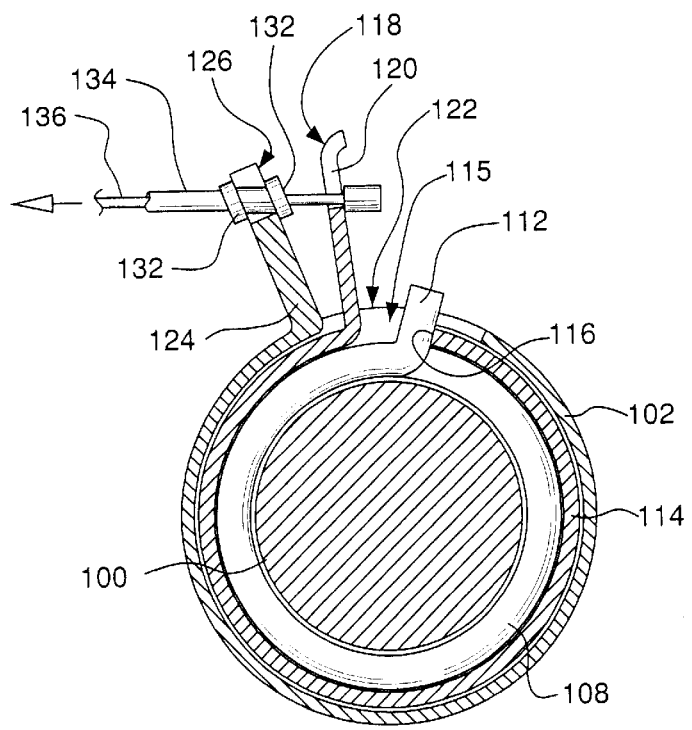
FIG. 6 is a cross-sectional view through the clamp seen in FIG. 4, with the clamp released.

Referring now also to FIGS. 4 to 6, the adjuster strut 80 comprises an inner shaft 100, on which the lower eye 82 is mounted, and a strut member in the form of an outer sleeve 102, on which the upper eye 88 is mounted. As may be seen in FIG. 2, the upper eye 88 is offset forwards of the axis of the outer sleeve 102, so that the sleeve can slide fully onto the inner shaft 100 without being obstructed by the bolt 90. An end-stop may be provided at the upper end of the inner shaft 100 to prevent its being pulled out of the outer sleeve 102. The inner shaft 100 is guided within the outer sleeve 102 by two bearing collars 104, which are held in place within the outer sleeve by spot welds 106 or other convenient means. Between the two collars 104 are a pair of spring brakes 108. Each of the spring brakes 108 consists of a stiff helical coil spring, with the axially inner ends of the coil springs lying adjacent to one another, and the axially outer ends lying adjacent to the collars 104. In the relaxed positions of the coil springs 108, their internal diameters would be slightly smaller than the diameter of the inner shaft 100. Therefore, in their resting position they are wound tightly round the inner shaft, gripping it frictionally with a high total gripping force. Because the springs 108 abut each other and the collars 104, they present a high frictional resistance to any axial movement of the collars 104, and thus of the outer sleeve 102, relative to the inner shaft 100. They thus effectively prevent any change in the length of the adjuster strut 80, and thus prevent any pivoting of the tiller 18 relative to the body of the scooter 10. The outer diameter of the coil springs 108 is substantially less than the outer diameter of the collars 104 and the inner diameter of the outer sleeve 102.

The axially outer end of each coil spring 108 is turned to project axially and fits into a hole in the adjacent collar 104, preventing the coil springs from rotating. The axially inner end 112 of each coil spring 108 is turned to project radially outwards. The two coil springs 108 are symmetrically positioned, so that the projecting ends 112 are side by side. An actuating sleeve 114 is positioned round the coil springs 108, fitting loosely in the space between the outsides of the coil springs and the inside of the outer sleeve 102. The actuating sleeve 114 does not form a complete tube, but has an axially-extending slot 115 into which the ends 112 of the coil springs project. One circumferential end 116 of the actuating sleeve 114 rests against the projecting ends 112 of the coil springs 108. The other circumferential end of the actuating sleeve 114 projects radially outwards to form a tab 118 and has a notch 120 in it. The coil springs 108 and the actuating sleeve 114 are so orientated that the innermost turn of each coil spring 108 emerges from under the tab 118 of the sleeve, crosses the slot 115, and turns up to form the end 112.

The outer sleeve 102 has an axially-extending slot 122, through which the projecting ends 112 of the coil springs 108 and the projecting tab 118 of the actuating sleeve 114 project. On the side of the slot 122 that is nearer to the tab 118 of the actuating sleeve 114 than to the ends 112 of the springs 108, there is a radially-projecting tab 124, which has a notch 126 aligned with the notch 120 in the tab 118 of the actuating sleeve 114. In the resting condition of the adjuster strut 80, there is a space 128 between the tab 118 and the edge of the slot 122 with the tab 124. A Bowden cable 130 has a fitment 132 on its sheath 134 that fits into the notch 126 and clamps onto the tab 124. The core 136 of the Bowden cable 130 passes across the space 128 and through the notch 120, and has a head 138 that engages the tab 118.

The other end of the Bowden cable 130 is connected to an actuator 140. The actuator 140 comprises an adjustment lever 142 pivotally mounted in a housing 144 for movement between end positions. The actuator housing 144 is mounted on a convenient part of the scooter 10. As shown in FIG. 2, it is mounted on a shroud 146 that covers the tiller 18, but it could instead be mounted on another convenient part of the scooter 10. The sheath 134 of the Bowden cable 130 is attached to the actuator housing 144, and the core 136 of the Bowden cable 130 is attached to the adjustment lever 142, in such a manner that when the adjustment lever 142 is in one end position the Bowden cable 130 is relaxed, and that moving the adjustment lever 142 towards its other end position tensions the core 136 of the Bowden cable and pulls it through the sheath 134.

When the adjustment lever 142 is moved away from its resting end position, and the core 136 of the Bowden cable 130 is pulled through the sheath 134, the tabs 118 and 124 are squeezed together. The actuating sleeve 114 is thus rotated relative to the outer sleeve 102, and the end 116 of the actuating sleeve pushes the ends 112 of the springs 108 towards the tab 124. Because the outer ends of the springs 108 are held against rotation by the collars 104, which are fixed to the outer sleeve 102, and thus to the tab 124, this imposes a torsion on the springs 108. Because of the way the springs are wound, that torsion causes the coils of the springs 108 to expand, relaxing their grip on the inner shaft 100. That allows the inner shaft 100 to slide axially within the outer sleeve 102. The distance between the lugs 42 and the eye 74 can thus change, and the tiller 18 can be pivoted forwards or backwards on the steering shaft 54, and relative to the body of the scooter 10. When the tiller 18 has been set in a desired position, the adjustment lever 142 is released, the Bowden cable 134 relaxes, and the springs 108 tighten on the inner shaft 100, locking the tiller in the position in which it has just been set.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

For example, the scooter 10 shown in FIG. 1 is a 4-wheeled vehicle, but the tiller adjustment system described may also be applied to a 3-wheeled scooter, or to other forms of small motorized vehicle. If the vehicle is a 3-wheeled scooter, then the steering shaft 54 may be fixed directly to a fork carrying a single front wheel.

What is claimed is:

1. A motorized vehicle, comprising:
   at least one steerable wheel;
   a member mounted rotatably about an axis and operatively connected to the at least one steerable wheel such that rotation of the rotatably mounted member about that axis causes steering of the at least one steerable wheel;
   a pivot block mounted on a free end of said rotatably mounted member;
   a pair of lubricating plates of low-friction material on either side of said pivot block;
   a steering member to rotate said rotatably mounted member, comprising a pair of forks straddling said pivot block and bearing on said lubricating plates;
   a pivot pin passing through the forks and the pivot block transverse to the axis of rotation of said rotatably mounted member, about which the steering member is pivotable relative to the rotatably mounted member;
   a strut of variable length so connected to the steering member and to said mounting block that pivoting of said steering member relative to said rotatably mounted member requires a change in the length of said strut; and
   a clamp for locking said strut at any length corresponding to a desired pivotal position of the steering member.

2. The vehicle according to claim 1, wherein said rotatably-mounted member is a steering shaft mounted for rotation about its axis.

3. The vehicle according to claim 1, wherein said axis of pivoting intersects said axis of rotation.

4. The vehicle according to claim 1, wherein when the vehicle is on level ground with the steering in a straight ahead position, the said axis of pivoting is horizontal and is perpendicular to a lengthwise direction of the vehicle.

5. The vehicle according to claim 1, wherein said strut of variable length comprises an outer sleeve and an inner shaft, and wherein said clamp releasably secures the sleeve and the shaft together.

6. The vehicle according to claim 1, wherein said strut of variable length comprises a shaft and a strut member movable along said shaft to vary the length of said strut, and wherein said clamp is attached to said strut member, frictionally gripping said shaft and releasable for movement along said shaft.

7. The vehicle according to claim 6, wherein said releasable clamp comprises at least one helical coil spring that in a relaxed condition has an inside diameter smaller thin an outside diameter of the shaft, and that is released by applying, to it a torsional force tending to increase its diameter.

8. The vehicle according to claim 7, wherein said releasable clamp comprises two said helical coil springs wound in opposite senses.

9. The vehicle according to claim 8, wherein said two coil springs are positioned end to end, with their outer ends engaging the strut member and their abutting inner ends rotatable relative to the strut member.

10. The vehicle according to claim 1, wherein exposed surfaces of said lubricating plates define two parallel planes perpendicular to the axis of pivoting of said forks relative to said pivot block.

11. The vehicle according to claim 1, wherein said pivot block defines a pair of recesses, and wherein said lubricating plates fit into said recesses.

12. The vehicle according to claim 11, wherein each of said lubricating plates is generally triangular in shape.

13. The vehicle according to claim 11, wherein each of said recesses occupies a major portion of a side face of said pivot block, and is defined by a rim along the edge of said side face, and wherein said lubricating plates project above said rims.

14. A pivot block, having a bore for a pivot pin passing through said pivot block, and having a pair of recesses surrounding the ends of said bore on either side of said pivot block, and comprising a pair of lubricating plates of low-friction material in said recesses said lubricating plates defining bearing surfaces for a pair of forks disposed either side of the pivot block and pivoting about a pivot pin positioned in said bore.

15. The pivot block according to claim 14, wherein the bearing surfaces of said lubricating plates define two parallel planes perpendicular to the axis of pivoting of said forks relative to said pivot block.

16. The pivot block according to claim 14, wherein each of said lubricating plates is generally triangular in shape.

17. The pivot block according to claim 14, wherein each of said recesses occupies a major portion of a side face of said pivot block, and is defined by a rim along the edge of said side face, and wherein said lubricating plates project above said rims.

18. A motorized vehicle comprising:

at least one steerable wheel;

a steering shaft mounted for rotation about its axis and operatively connected to the at least one steerable wheel such that rotation of the steering shaft about its axis causes steering of the at least one steerable wheel;

a steering member connected to said to rotate said steering shaft, and pivotable relative to said steering shaft about an axis of pivoting transverse to the axis of said steering shaft, wherein said axis of pivoting intersects said axis of rotation, and when the vehicle is on level ground with the steering in a straight ahead position, the said axis of pivoting is horizontal and is perpendicular to a lengthwise direction of the vehicle;

a pivot block mounted on a free end of said steering shaft, a pair of forks on said steering member straddling said pivot block, and a pivot pin passing through the forks and the pivot block, about which pivot pin the steering member is pivotable relative to the steering shaft, said pivot block having a pair of lubricating plates of low-friction material on either side of said pivot block, so that said forks rest on said lubricating plates, to facilitate pivoting of said steering column; and a strut of variable length so connected to the steering member and to said rotatably mounted member that pivoting of said steering member relative to said rotatably adjustable member requires a change in the length of said strut, said strut comprising an inner shaft, an outer sleeve movable along said shaft to vary the length of said strut, two helical coil springs that in a relaxed condition have an inside diameter smaller than an outside diameter of the shaft, and tending to grip the shaft frictionally to resist movement along the shaft, the coil springs being wound in opposite senses, positioned end to end, with their outer ends so engaging the sleeve as to prevent movement of the sleeve relative to the coil springs along the shaft and their abutting inner ends projecting radially and rotatable relative to the strut member, and an actuator attached to said strut member and arranged to apply to the inner ends of said coil springs a force in a direction tending to increase the diameter of said coil springs.

* * * * *